United States Patent [19]

Boutaghou

[11] Patent Number: 5,796,556
[45] Date of Patent: Aug. 18, 1998

[54] FLEX ON SUSPENSION DESIGN MINIMIZING SENSITIVITIES TO ENVIRONMENTAL STRESSES

[75] Inventor: Zine-Eddine Boutaghou, St. Paul, Minn.

[73] Assignee: Seagate Technology, Inc., Scotts Valley, Calif.

[21] Appl. No.: 926,579

[22] Filed: Sep. 4, 1997

Related U.S. Application Data

[62] Division of Ser. No. 712,276, Sep. 11, 1996, Pat. No. 5,701,218.

[60] Provisional application No. 60/021,205 Jul. 3, 1996.

[51] Int. Cl.$^6$ .................. G11B 5/60; G11B 21/21
[52] U.S. Cl. .................................... 360/104
[58] Field of Search ................................ 360/104

[56] References Cited

U.S. PATENT DOCUMENTS

| | | | |
|---|---|---|---|
| 5,006,946 | 4/1991 | Matsuzaki | 360/104 |
| 5,041,932 | 8/1991 | Hamilton | 360/104 |
| 5,063,712 | 11/1991 | Hamilton et al. | 51/67 |
| 5,124,864 | 6/1992 | Matsuzaki | 360/104 |
| 5,163,218 | 11/1992 | Hamilton | 29/603 |
| 5,174,012 | 12/1992 | Hamilton | 29/603 |
| 5,282,102 | 1/1994 | Christianson | 360/104 |
| 5,353,181 | 10/1994 | Frater et al. | 360/104 |
| 5,453,315 | 9/1995 | Hamilton et al. | 428/209 |
| 5,463,513 | 10/1995 | Hoshino | 360/104 |
| 5,476,131 | 12/1995 | Hamilton et al. | 216/13 |
| 5,483,025 | 1/1996 | Hamilton et al. | 174/254 |
| 5,490,027 | 2/1996 | Hamilton et al. | 360/104 |
| 5,491,597 | 2/1996 | Bennin et al. | 360/104 |
| 5,519,552 | 5/1996 | Kohira | 360/104 |
| 5,557,488 | 9/1996 | Hamilton et al. | 360/104 |

*Primary Examiner*—Robert S. Tupper
*Attorney, Agent, or Firm*—Westman, Champlin & Kelly, P.A.

[57] ABSTRACT

An improved flexure for supporting a magnetic head carrying slider is disclosed. The flexure includes a load beam and a flexible circuit. The flexible circuit includes a carrier material, a plurality of electrical traces supported by the carrier material for electrically coupling to the magnetic head carried by the slider, and a gimbal insert member supported by the carrier material in a position substantially coplanar with the plurality of electrical traces. The gimbal insert member is mechanically coupled to the load beam and to the slider such that the gimbal insert member supports the slider for gimbaled motion relative to the load beam.

7 Claims, 2 Drawing Sheets

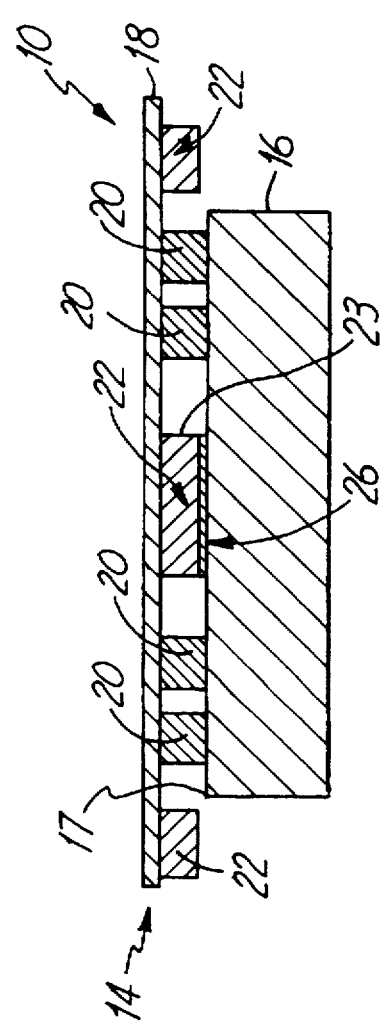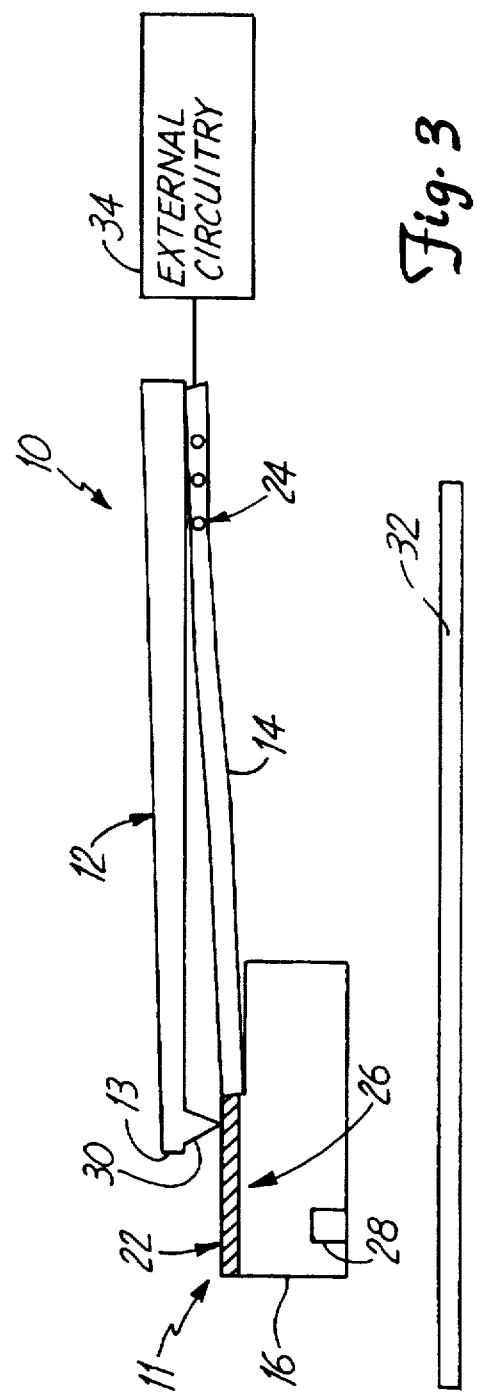

5,796,556

1

FLEX ON SUSPENSION DESIGN MINIMIZING SENSITIVITIES TO ENVIRONMENTAL STRESSES

This is a Divisional of application Ser. No. 08/712,276, now U.S. Pat. No. 5,701,218 filed Sep. 11, 1996 which is based on provisional application Ser. No. 60/021,205, filed Jul. 3, 1996.

BACKGROUND OF THE INVENTION

The present invention relates generally to actuators for supporting magnetic head sliders in disc drive data storage systems. More particularly, the present invention relates to a combined gimbal flexure and electrical interconnect assembly which minimizes sensitivities to environmental stresses and which improves pitch and roll moment control.

Typically prior art flex suspension designs include a gimbal structure formed integrally with a load beam or suspension. A flexible circuit, known as a "flex cable" and typically including electrical traces supported by a polymeric carrier material, replaces the conventional electric wires which connect the read\write elements on the magnetic head slider to the arm electronics. This design has numerous shortcomings. For example, because of the sensitive nature of polyamides to both temperature and humidity, the pitch static attitude (PSA) and roll static attitude (RSA) are very difficult to control. The high membrane rigidity of the flex cable combines with the stiffness of the suspension to yield pitch and roll stiffnesses much greater than in traditional designs which did not use flex cables. The high RSA and PSA, combined with the increased pitch and roll stiffnesses, yields pitch and roll moments much greater than in traditional designs.

Consequently, a flex suspension design which provides improved pitch and roll control and which minimizes the pitch and roll sensitivities to environmental stresses would be a significant improvement in the art. The present invention provides just such an improved flex suspension design.

SUMMARY OF THE INVENTION

An improved flexure for supporting a magnetic head carrying slider is disclosed. The flexure includes a load beam and a flexible circuit. The flexible circuit includes a carrier material, a plurality of electrical traces supported by the carrier material for electrically coupling to the magnetic head carried by the slider, and a gimbal insert member supported by the carrier material in a position substantially coplanar with the plurality of electrical traces. The gimbal insert member is mechanically coupled to the load beam and to the slider such that the gimbal insert member supports the slider for gimbaled motion relative to the load beam.

BRIEF DESCRIPTION OF THE DRAWINGS

FIG. 2 is a diagrammatic end cross-sectional view of the improved flexure or actuator of the present invention illustrated in FIG. 1, which further illustrates attachment of the slider to the flexible circuit gimbal insert.

FIG. 3 is a diagrammatic side view illustrating further advantageous features of the improved flexure or actuator of the present invention.

DETAILED DESCRIPTION OF THE PREFERRED EMBODIMENTS

Figure 1:
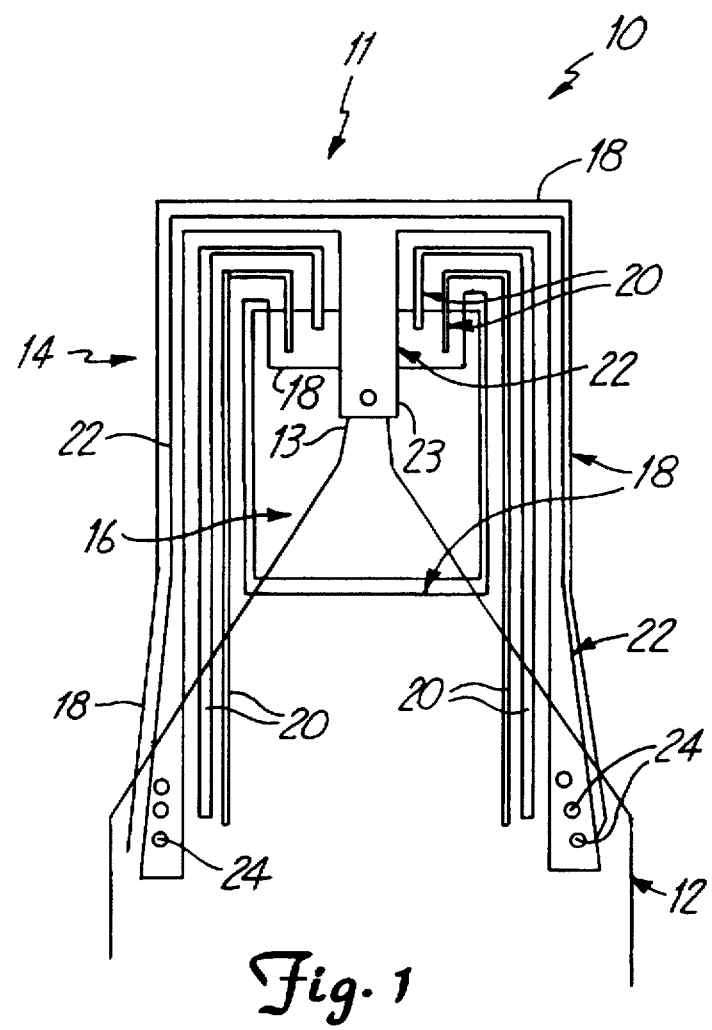
FIG. 1 is a bottom diagrammatic view (i.e. viewed from the direction of the magnetic disc) of the improved flexure or actuator of the present invention.

The present invention is based partially upon the recognition that an integrated gimbal and flexible circuit can be used to tailor the pitch and roll stiffnesses of the flexure, while minimizing the pitch and roll sensitivities to environmental stresses. The flexible circuit or flex cable of the present invention provides two functions. First, it provides the electrical connection from the magnetic data head on the slider to the arm or external electronics. Second, the flex cable is modified to provide the gimbal structure. Unlike prior art attempts to utilize the flexible circuit as a portion of the gimbal structure, the present invention includes a gimbal insert or backbone to minimize large RSA and PSA sigmas and to enable designers to tailor the pitch and roll stiffnesses.

FIG. 1 is a bottom diagrammatic view (i.e viewed from the direction of the magnetic disc) of one embodiment of an improved flexure or actuator in accordance with the present invention. Flexure 10 of the present invention includes load beam or suspension 12 and flex cable 14. Near distal end 11, flexure 10 supports magnetic head carrying slider 16 over a magnetic disc 30 (shown in FIG. 3). At an opposite end (not shown), suspension 12 of flexure 10 can be connected to an E-block arm. Flex cable 14 includes carrier 18 made of polyamide or other preferably suitable materials, electrical traces 20 and gimbal insert 22. Electrical traces 20 are preferably copper (Cu) conductors. Gimbal insert 22 is preferably a metallic material, for example iron-chromium (FeCr).

Arm 23 of gimbal insert 22 extends away from distal end 11 of the flexure, back toward suspension 12. Slider 16 is mounted or attached to arm 23 of gimbal insert 22 such that, when flex cable 14 is attached to suspension 12 via welding points or apertures 24, a load tab or button (shown in FIG. 3) on extension 13 of suspension 12 applies a pre-load force on flex cable 14 and thus on slider 16. With slider 16 mounted to gimbal insert 22, electrical traces 20 are electrically coupled to the magnetic read and\or write data heads on slider 16.

With the exception of gimbal insert 22, flex cable 14 is similar to flexible circuits of the type known in the art. Numerous known manufacturing processes can therefore be adapted to produce flex cable 14 in accordance with the present invention. For example, in one manufacturing process, Cu is deposited and etched on polyamide carrier material 18 in the final shape of electrical traces 20. Next, the polyamide carrier material is laser machined to allow for slider attachment and to expose electrical traces 20. Gimbal insert 22 is etched on a separate stainless steel sheet. Then, gimbal insert 22 is attached to the polyamide carrier material in the desired location.

When producing gimbal insert 22 for attachment to carrier 18, welding points 24 are added to gimbal insert 22 to provide a mechanism for attachment of flex cable 14 to suspension 12. After slider 16 has been attached, for example, with adhesive, to gimbal insert 22, the gimbal insert is preferably laser welded to suspension 12 via welding points 24.

FIG. 2 is a diagrammatic end cross sectional view of the embodiment of the improved flexure illustrated in FIG. 1, which further shows attachment of the slider to the flex cable gimbal insert. The cross-sectional view in FIG. 2 is taken from distal end 11 of flexure 10. For ease of illustration, suspension 12 is not shown in FIG. 2. As can be seen in the preferred embodiment illustrated in FIG. 2, slider 16 is attached to arm 23 of gimbal insert 22, preferably using adhesive 26. Adhesive 26 can be any of a wide variety of adhesives known in the art.

As shown in FIG. 2, portions of gimbal insert 22 are positioned outside of electrical traces 20 near the outer edges of carrier material 18. This helps to provide flex cable 14 with desired pitch and roll stiffnesses. The specific features of gimbal insert 22 can be tailored to achieve the desired pitch and roll stiffnesses in a number of ways. For example, the dimensions of gimbal insert 22 can be selected to aid in obtaining particular pitch and roll stiffnesses. Also, the specific placement of gimbal insert 22 on carrier material 18 can be changed somewhat to tailor the stiffnesses. Further, the material used for gimbal insert 22 can be changed to utilize the different stiffening properties of different materials.

FIG. 3 is a side view illustrating further advantageous features of the improved flexure of the present invention. As is illustrated diagrammatically in FIG. 3, flex cable 14 is laser welded, using welding points 24, to suspension 12. However, in other embodiments, flex cable 14 is attached to suspension 12 using adhesives or other attachment mechanisms. Also as shown in FIG. 3, suspension 12 includes load tab on extension 13, which applies a pre-load force to flex cable 14 in order to thereby provide a pre-load force to slider 16. As in known in the art, this pre-load force aids in "flying" slider 16 over magnetic disc 32 during operation of the disc drive date storage system. However, it must be noted that the illustration in FIG. 3 is merely an example, and is not intended to represent any particular slider orientation relative to disc 32 during operation. FIG. 3 also illustrates magnetic data head 28 on slider 16, which is electrically coupled via traces 20 and bond pads (not shown) on a surface of slider 16 to external circuitry 34 located, for example, on the arm or elsewhere. External circuitry 34 cooperates with magnetic data head 28 to read/write data from/to disc 32. It must be noted that more than one data head 28 can be located on slider 16. Further, the position of data head 28 on slider 16 shown in FIG. 3 is merely illustrative and is not intended to imply any preferred data head location.

In the flex suspension design of the present invention, flex cable 14 serves several functions. It provides the electrical connections between magnetic head 28 (through bond pads on the slider) and external circuitry 34. It also provides the gimbal structure for the flexure. The specific design of the gimbal incorporates features which minimize large RSA and PSA sigmas, and enables designers to tailor the pitch and roll stiffnesses.

Gimbal insert 22 provides the structure which enables designers to tailor the pitch and roll stiffnesses by adding the stiffness of insert 22 to the existing stiffness of electrical traces 20 and to the existing stiffness of carrier material 18. Thus, the present invention provides a highly advantageous improvement over the prior art, in that it decouples the resistivity requirements of electrical traces 20 from the stiffness requirements of insert 22. Without gimbal insert 22, either the stiffness of flex cable 14 would be heavily influenced by the resistivity requirements of electrical traces 20, or the resistivity of electrical traces 20 would be heavily influenced by the stiffness requirements of flex cable 14.

Another advantageous feature of the present invention is that use of gimbal insert 22 provides an integrated electrical interconnect gimbal structure which is substantially coplaner with upper surface 17 of slider 16, since gimbal insert 22 provides features for attachment of the slider. A significant contribution of the present invention relates to the fact that electrical traces 20 are made coplaner to the gimbal assembly (i.e. gimbal insert 22). By maintaining the coplanarity of the electrical connections, less torsional and bending moments will be generated on the slider. The effective vertical offset distances between the gimbal structure and the electrical connections becomes virtually zero, compared to a few mils as exists in many conventional designs.

In preferred embodiments the metallic material used for gimbal insert 22 is significantly less sensitive to temperature and humidity than is the polyamide or other material used as carrier 18. Thus, insert 22 provides rigidity, which is relatively insensitive to exposure to temperature extremes and humidity, to flex cable 14. Another advantage provided by gimbal insert 22 is that, when a metallic material is used, electrical grounding of slider 16 to flexure 12 (through insert 22) is ensured. Also, the polyamide material of carrier 18 provides additional damping to the gimbal structure, thus reducing gimbal vibrations.

Although the present invention has been described with reference to preferred embodiments, workers skilled in the art will recognize that changes may be made in form and detail without departing from the spirit and scope of the invention.

What is claimed is:

1. A flexure for supporting a magnetic head carrying slider, the flexure comprising:

flexible circuit means for electrically coupling the magnetic head, and supporting the slider; and load bearing means for supporting the flexible circuit means.

2. A flexure for supporting a magnetic head carrying slider, the flexure comprising:

load beam means for supporting a load; and a flexible circuit comprising:

means for carrying electrical trace means supported by the means for carrying for electrically coupling to the magnetic head carried by the slider; and gimbal insert means supported by the means for carrying and coupled to the load beam means.

3. The flexure of claim 2 wherein the gimbal means is substantially coplanar with the electrical trace means.

4. A combined gimbal flexure and electrical interconnect assembly for attachment to a disc drive actuator load beam and for supporting a magnetic head carrying slider, comprising:

means for carrying extending from the load beam to a location proximate the slider;

means for electrically conducting extending from the load beam to a location proximate the slider and being attached to the means for carrying for electrically coupling the magnetic head carried by the slider to external circuitry; and means for stiffening extending from the load beam to a location proximate the slider and being attached to the means for carrying.

5. The combined gimbal flexure and electrical interconnect assembly of claim 4 wherein the means for carrying is substantially coplanar with the means for electrically conducting.

6. An actuator for supporting a magnetic head carrying slider, the actuator comprising:

a suspension member; and a flex cable comprising:

means for carrying;

means for gimbaling coupled to the means for carrying, the suspension member and the slider;

means for electrically conducting supported by the means for carrying.

7. The actuator of claim 6 wherein the means for electrically conducting is substantially coplanar with the means for gimbaling.

* * * * *